United States Patent [19]

Colombo

[11] Patent Number: 5,029,000
[45] Date of Patent: Jul. 2, 1991

[54] HIGH DEFINITION TELEVISION SYSTEM
[75] Inventor: Sandro G. Colombo, Eindhoven, Netherlands
[73] Assignee: U.S. Philips Corp., New York, N.Y.
[21] Appl. No.: 446,492
[22] Filed: Dec. 5, 1989

[30] Foreign Application Priority Data

Dec. 23, 1988 [NL] Netherlands .................. 8803149

[51] Int. Cl.$^5$ .......................................... H04N 11/02
[52] U.S. Cl. ................................... 358/133; 358/12; 358/105; 358/141
[58] Field of Search ............... 358/105, 133, 140, 11, 358/12, 13, 141

[56] References Cited

U.S. PATENT DOCUMENTS

| | | | |
|---|---|---|---|
| 4,670,773 | 6/1987 | Silverberg | 358/12 |
| 4,864,398 | 9/1989 | Avis | 358/105 |
| 4,873,573 | 10/1989 | Thomas | 358/133 |
| 4,890,160 | 12/1989 | Thomas | 358/105 |
| 4,931,855 | 6/1990 | Salvadorini | 358/105 |

OTHER PUBLICATIONS

"HDTV Motion Adaptive Bandwidth Reduction Using DATV"; by Storey, BBC Research Department Report, BBC RD 1986/5, 6/86, pp. 1–7.

Primary Examiner—Howard W. Britton
Attorney, Agent, or Firm—Michael E. Marion

[57] ABSTRACT

In a receiver for a high-definition television system a complicated motion compensated interpolation circuit for the chrominance can be dispensed with; in the event of small motions the interferences caused thereby are so small as to be disregarded, in the event of larger motions disturbing differences between the motion compensated luminance and the non-motion compensated chrominance can be prevented by switching to a processing operation which provides a lower spatial resolution for the chrominance. Herein, use is made of the fact that the eye is less sensitive to short-comings in (the resolution of) the chrominance signal than for short-comings in (the resolution of) the luminance signal. The render such a receiver possible, the television signal must be adequately processed at the transmitter end.

19 Claims, 2 Drawing Sheets

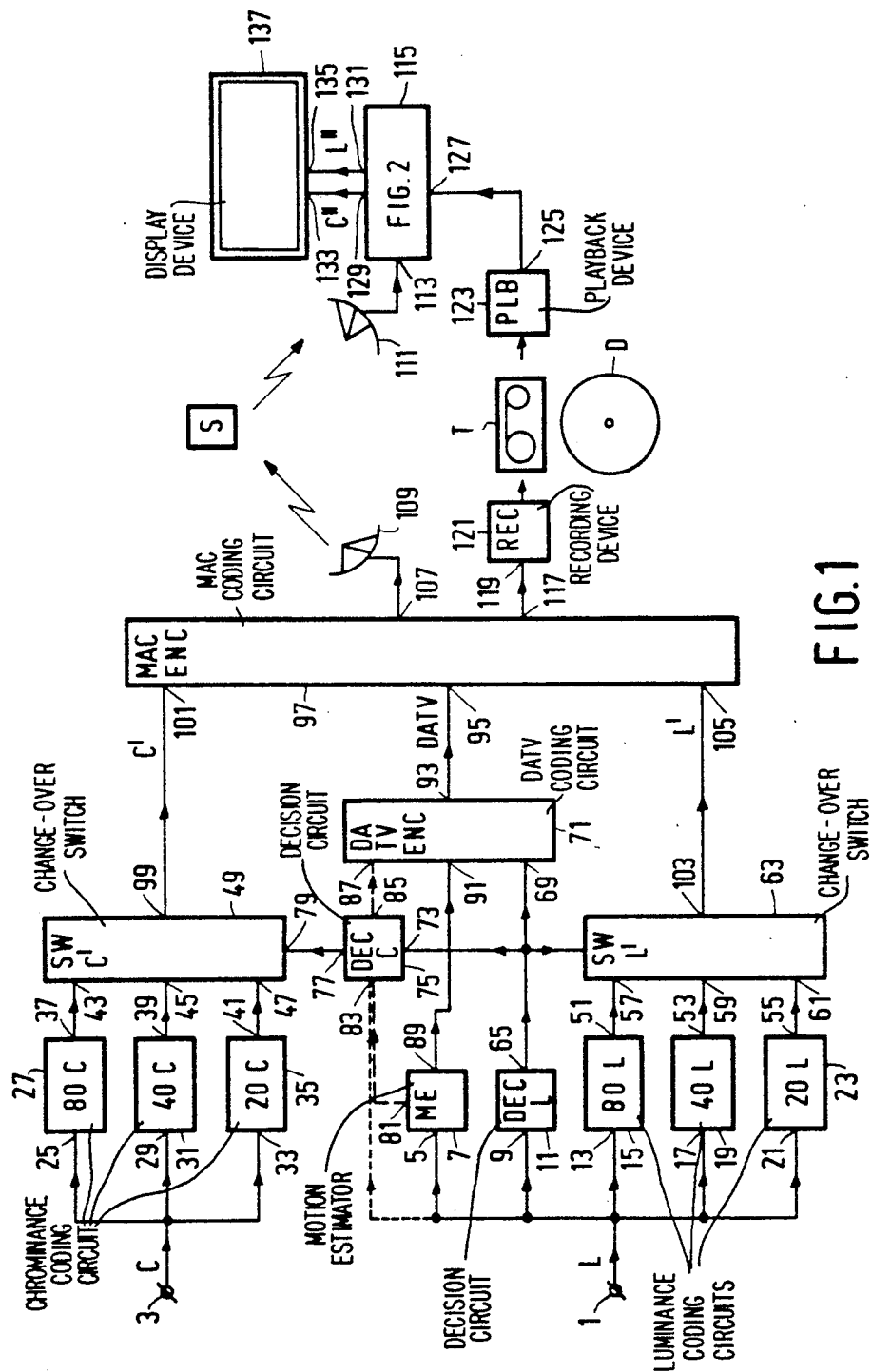

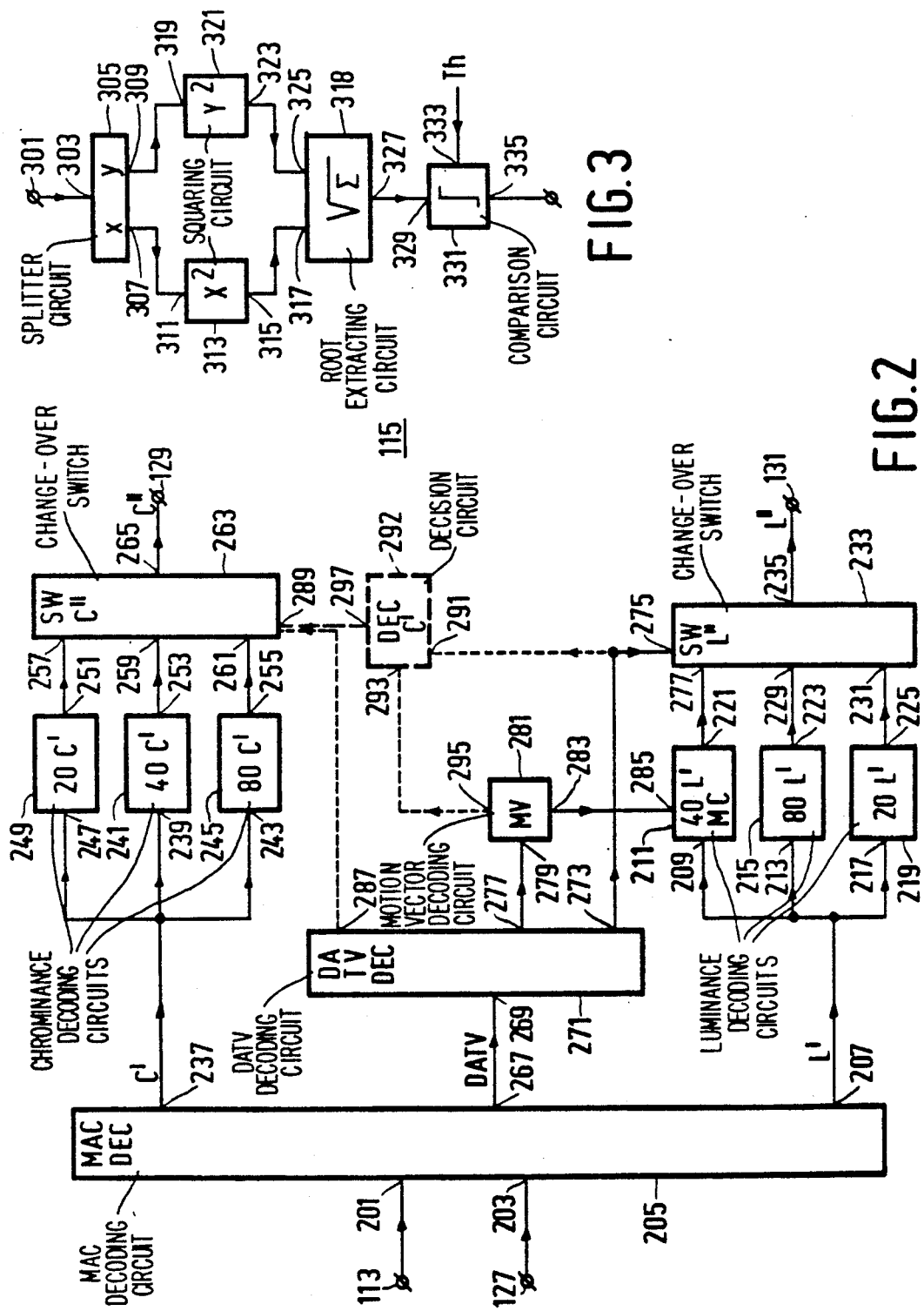

HIGH DEFINITION TELEVISION SYSTEM

BACKGROUND OF THE INVENTION

The invention relates to a method of transmitting or storing a television signal via a transmission or storage channel, the television signal comprising a video signal having a luminance and a chrominance signal, the method comprising the production of a television signal to be applied to the channel in accordance with a plurality of possible processing operations on the video signal which provide mutually different distributions of spatial and/or temporal resolution, and a choice of a processing operation from among the plurality of possible processing operations on the video signal, one of the operations comprising the determination of motion vectors.

The invention also relates to a storage medium.

The invention also relates to an arrangement for receiving and/or displaying a television signal, the television signal comprising a video signal having a luminance and a chrominance signal, the arrangement comprising means for the production of a television signal in accordance with a plurality of possible processing operations on the video signal which provide mutually different distributions of spatial and/or temporal resolution, and a choice of a processing operation from among the plurality of possible processing operations on the video signal, said production means including means for a motion-compensated interpolation with the aid of motion vectors at one of said processing operations.

The invention also relates to an arrangement for transmitting or storing a television signal via a transmission or storage channel, the television signal comprising a video signal having a luminance and a chrominance signal, the arrangement comprising means for the production of a television signal to be applied to the channel, in accordance with a plurality of possible processing operations on the video signal which provide mutually different distributions of spatial and/or temporal resolution, means for choosing a processing operation from among the plurality of possible operations on the video signal, and means for the determination of motion vectors in one of the processing operations.

Such a method and such arrangements are known from the article "Motion compensated interpolation applied to HD-MAC pictures encoding and decoding", 2nd International Workshop on Signal Processing of HDTV, 29/2-3/3 1988, in which a high definition television system with three possible processing operations on the television signal is described, one of these operations being accompanied by the estimation of motion vectors in the transmitter and motion compensated interpolation in the receiver.

SUMMARY OF THE INVENTION

It is an object of the invention to provide a high definition television system having a simple receiving and/or display device.

According to the invention, a method of the type disclosed in the opening paragraph is characterized in that said processing operation comprising the determination of motion vectors, includes an operation on the chrominance signal with a motion dependent choice between an operation which provides a first distribution between spatial and/or temporal resolution, and an operation which provides a different distribution between spatial and/or temporal resolution with a lower spatial resolution than at the first distribution.

According to the invention, a receiving and/or displaying arrangement of the type defined in the opening paragraph is characterized by means for making a motion dependent choice in said motion compensated processing between a processing operation on the chrominance signal which provides a first distribution between spatial and/or temporal resolution, and a processing operation on the chrominance signal which provides a different distribution between spatial and/or temporal resolution with a lower spatial resolution than at said first distribution.

A further arrangement for transmitting or storing a television signal via a transmission or storage channel, the television signal comprising a video signal having a luminance and a chrominance signal, the arrangement comprising means for the production of a television signal to be applied to the channel, in accordance with a plurality of possible processing operations on the video signal which provide mutually different distributions of spatial and/or temporal resolution, means for the choice of a procesing operation from among the plurality of possible processing operations on the video signal and means for the determination of motion vectors in one of the processing operations, is characterized by means for making at said processing operation comprising the determination of motion vectors, a motion dependent choice between an operation on the chrominance signal which provides a first distribution between spatial and/or temporal resolution, and an operation on the chrominace signal which provides a different distribution between spatial and/or temporal resolution with a lower spatial resolution than at the first distribution.

The invention is based on the recognition that a complicated motion compensated interpolation circuit for the chrominance can be omitted from the receiver; interferences caused by small motions can be disregarded, when the motions are greater, disturbing differences between the motion compensated luminance and the non-motion compensated chrominance can be avoided by switching over to a processing operation which provides a lower spatial resolution for the chrominance. In this situation use is made of the fact that the eye is less sensitive to shortcomings in (the resolution of) the chrominance signal than for short-comings in (the resolution of) the luminance signal. To allow such a simple receiving device the television signal must be appropriately processed at the transmitter side.

BRIEF DESCRIPTION OF THE DRAWINGS

The invention will now be described in greater detail by way of non-limitative example with reference to the accompanying drawings, wherein:

FIG. 1 shows a high definition television system,

FIG. 2 shows a receiver for the high definition television system as shown in FIG. 1, and FIG. 3 shows a circuit for measuring the magnitude of a motion vector.

DETAILED DESCRIPTION OF THE INVENTION

FIG. 1 shows a high definition television system having a transmitter section and a receiver section. For a further explanation, more specifically for an explanation of the expressions used hereinafter, reference is made to the aforesaid article and to the Netherlands patent application 88.00449 (U.S. Pat. app. Ser. No. 288,058, filed Dec. 20, 1988), corresponding to copending U.S. application Ser. No. 288,058, filed Dec. 20, 1988 and assigned to the same assignee, which is to be considered as being included herein by reference. The transmitter section has for its task to so encode a high definition television signal having, for example 1250 lines per picture, distributed in an interlaced manner over 2 fields per picture at a field frequency of 50 fields per second that a television signal to be transmitted or to be stored can be received and displayed without excessive interferences by normal definition MAC receivers, of course with a resolution which is not higher than belonging to a normal definition MAC television signal. The compatible television signal thus encoded is then denoted a HD-MAC television signal. The receiving section has for its task to decode a received HD-MAC television signal again into a television signal having 1250 lines per picture, wherein at a slight motion a high spatial resolution can be obtained.

A luminance signal L of the high definition television signal is applied to a luminance signal input 1 of the transmitting section of the high definition television system, the high definition television signal further including inter alia a chrominance signal C which is applied to the chrominance signal input 3 of the transmitting section. The luminance signal input 1 is connected to an input 5 of a motion estimator (ME) 7, to an input 9 of a decision circuit (DEC L) 11 for the luminance signal L, to an input 13 of a luminance coding circuit (80L) 15 which provides a high spatial resolution at a refreshing period of 80ms, to an input 17 of a luminance coding circuit (40 L) 19 which provides a medium spatial resolution at a refreshing period of 40 ms, and to an input 21 of a luminance coding circuit (20 L) 23 which provides a low spatial resolution at a refreshing period of 20 ms. Similarly, the chrominance signal input 3 is connected to an input 25 of a chrominance coding circuit (80 C) 27 which provides a high spatial resolution at a refreshing period of 80 ms, to an input 29 of a chrominance coding circuit (40 C) 31 which provides a medium spatial resolution at a refreshing period of 40 ms, and to an input 33 of a chrominance coding circuit (20 C) 35 which provides a low spatial resolution at a refreshing period of 20 ms. Outputs 37, 39 and 41 of the chrominance coding circuit 27, 31 and 35, respectively, are connected to chrominance signal inputs 43, 45 and 47, respectively, of a change-over switch (SW C') 49 for a processed chrominance signal C'. Similarly, outputs 51, 53 and 55 of the luminance coding circuits 15, 19 and 23, respectively, are connected to luminance signal inputs 57, 59 and 61, respectively, of a change-over switch (SW L') 63 for a processed luminance signal L'.

To control the change-over switch 63 an output 65 of the decision circuit 11 is connected to the control input 67 of this switch. The output 65 of the decision circuit 11 is further connected to a luminance decision circuit input 69 of a DATV coding circuit (DATV ENC) 71 and to a control input 73 of a decision circuit (DEC C) 75 for the chrominance signal C, an output 77 of which is connected to a control input 79 of the change-over switch 49. An output 81 of the motion estimator 7 may be connected to a further control input 83 of the decision circuit 75 via a broken-line connection in the drawing. In a further embodiment the control input 83 of the decision circuit 75 may be connected directly via a dotted-line connection in the drawing to the luminance signal input 1 of the transmitter section. An output 85 of the decision circuit 75 may be connected to a chrominance decision input 87 of the DATV coding circuit 71 via a broken-line connection in the drawing. An output 89 of the motion estimator 7 is connected to a motion vector input 91 of the DATV coding circuit 71, an output 93 of which is connected to a DATV-input 95 of a MAC coding circuit (MAC ENC) 97. An output 99 of the change-over switch 49 applies the processed chrominance signal C' to a chrominance signal input 101 of the MAC coding circuit 97. An output 103 of the change-over switch 63 applies the processed luminance signal L' to a luminance signal input 105 of the MAC coding circuit 97.

For the mode of operation of the above-described transmitter section reference is first made to said article and said patent application. The transmitter section according to the invention deviates therefrom in that it is provided with the decision circuit (DEC C) 75 for the chrominance signal C, which operates as follows. So as to allow a simpler receiver in which the 40 ms branch is indeed motion-compensated for the luminance, but not for the chrominance, the situation is such that when the 40 ms branch is chosen for the luminance in the chrominance section of the transmitter section, the 40 ms branch is chosen in the case of small motions and the 20 ms branch is chosen for large motions. The invention is based on the recognition that a complicated motion compensated interpolation circuit for the chrominance can be omitted; in the event of small motions the interferences caused thereby are so small as to be disregarded, in the event of larger motions disturbing differences between motion compensated luminance and non-motion compensated chrominance can be prevented by a switch to a processing operation which provides a lower spatial resolution for the chrominance. The fact that the eye is less sensitive to short-comings in (the resolution of) the chrominance signal then to short-comings in (the resolution of) the luminance signal can then be made use of. As regards the 80 ms and the 20 ms branches, the decision circuit 75 for the chrominance signal follows the decisions of the decision circuit 11 for the luminance signal. The decision circuit 75 for the chrominance signal must consequently be able to distinguish between "large" and "small" motions in the 40 ms branch. The motion vectors determined for the luminance can then be used advantageously: when a magnitude of these motion vectors which can be determined with the aid of the Pythagoras' Theorem exceeds a predetermined threshold, the motion is considered to be "large", and in the other case the motion is considered to be "small". A threshold of 6 picture elements per picture period was found to be very suitable. Of course the magnitude of the motion can directly be determined from the luminance signal applied to the luminance signal input 1, for example as described in the Netherlands patent application 88.00452 (PHN 12.453). The decision taken by the decision circuit 75 can be applied via the broken-line connection in the drawing to the input 87 of the DATV coding circuit 71 to be applied via the DATV signal to the receiving section; it is alternatively possible for the receiver to use the magnitude of the motion vectors to arrive at the correct decision, which possibility provides a somewhat more complex receiver, but requires the transmission of a lower number of bits in the DATV signal.

When film pictures are transmitted, the 20 ms branch then not being used since the temporal resolution with film pictures is not higher than 24 Hz, the decision circuit 75 for the chrominance need not do more then convey the decisions of the decision circuit 11 for the luminance to the input 79 of the change-over switch 49 for the chrominance.

The MAC coding circuit 97 has a first output 107 which is connected to a transmission device which is symbolically shown by means of a satellite send aerial 107, for the transmission of the encoded HD-MAC television signal. Via a satellite S the encoded HD-MAC television signal reaches a receiver device which is symbolically shown by means of a satellite receiving aerial 11, which is connected to an input 113 of a receiver device 115 which is shown in greater detail in FIG. 2. Further transmission possibilities include, for example, the transmission of the encoded HD-MAC television signal via a cable television network or via terrestial transmission devices.

The MAC coding circuit 97 further has a second output 117 which is connected to an input 119 of a recording device (REC) 121. The recording device stores the HD-MAC television signal in a storage medium, which storage medium may, for example, be a magnetic tape T or an optically readable disc D. The storage medium can be played back on a playback device (PLB) 123, an output 125 of which is connected to a second input 127 of the receiver device 115. Outputs 129 and 131 of the receiver device 115 are connected to respective inputs 133 and 131 of a display device 137 to apply thereto a decoded chrominance signal C" and a luminance signal L", respectively.

In FIG. 2 the inputs 113 and 127 of the receiving device 115 are connected to the respective inputs 201 and 203 of a MAC decoder circuit (MAC DEC) 205. At an output 207 of the MAC decoder circuit 205 the luminance signal L' processed by the transmitter section is applied to an input 209 of a motion compensated medium resolution luminance decoder circuit (40 L' MC) 211, to an input 213 of a high resolution luminance decoder circuit (80 L') 215, and to an input 217 of a low resolution luminance decoder circuit (20L'). Outputs 221, 223 and 225 of the luminance decoder circuits 211, 215 and 219, respectively, are connected to luminance signal inputs 227, 229 and 231, respectively, of a change-over switch (SW L") 233, which from an output 235 applies a decoded luminance signal L" to the output 131 of the receiving device 115.

At an output 237 of the MAC decoder circuit 205 the chrominance signal C' processed by the transmitter section, is applied to an input 239 of a medium resolution chrominance decoder circuit (40 C') 241, to an input 243 of a high resolution chrominance decoder circuit (80 C') 245, and to an input 247 of a low resolution chrominance decoder circuit (20C') 249. Outputs 251, 253 and 255 of the chrominance decoder circuit 249, 241 and 245, respectively, are connected to chrominance signal inputs 257, 259 and 261, respectively, of a change-over switch (SW C") 263 which from an output 265 applies a decoded chrominance signal C" to the output 129 of the receiving device 115.

From an output 267 of the MAC decoder circuit 205 the DATV signal generated by the DATV coding circuit 71 of the transmitting section of FIG. 1 is applied to an input 269 of a DATV decoding circuit (DATV DEC) 271. A first output 273 of the DATV decoding circuit 271 applies a control signal to a control input 275 of the change-over switch 233. A second output 277 of the DATV decoding circuit 271 is connected to an input 279 of a motion vector decoding circuit (MV) 281, an output 283 of which applies motion vectors to the motion compensated medium resolution luminance decoding circuit 211. A third output of the DATV decoding circuit may be connected to a control signal input 289 of the change-over switch 263 via a dotted-line connection shown in the drawing, in the event in which the decision of the decision circuit 75 for the chrominance signal in the transmission section is conveyed to the receiver via the DATV signal. In the other case the first output 273 of the DATV decoding circuit 271 is also connected via a broken-line connection in the drawing to a first input 291 of a decision circuit (DEC C') 292, a second input 293 of which is connected to a further output 295 of the motion vector decoding circuit 281, and an output 297 of the decision circuit 292 is connected to the control input 289 of the change-over switch 263. In the case in which the 20 ms branch or the 80 ms branch has been opted for, the decision circuit 292 for the chrominance will also opt for the 20 ms branch or for the 80 ms branch, respectively. In the case in which for the luminance the motion compensated 40 ms branch is opted for, the decision circuit 292 for the chrominance will opt in the event of "small" motions for the non-motion compensated 40 ms branch, and for "large" motions for the 20 ms branch. In this situations use is made of the motion vectors supplied by the motion vector decoding circuit 281, from which, using the Pythagoras' theorem, the magnitude of the motion can be derived. A suitable threshold for the decision whether a motion vector is large or small, amounts to 6 picture elements per picture period.

When film pictures are received, the 20 ms branch then not being used since the temporal resolution of film pictures does not exceed 24 Hz, the decision circuit 292 can directly convey the control signal supplied by the DATV decoding circuit 271 to the control input of the change-over switch 263. Preferably, for that purpose, the DATV signal will indicate whether film pictures are received, for example by means of a film mode bit.

In all further respects reference is made for the operation of the receiving device 115 to said article and said Netherlands patent application 88.00449.

FIG. 3 shows a circuit with which the magnitude of motion vectors can be measured and which operates in accordance with the Pythagoras' Theorem. An input 301 thereof, which is, for example, connected to the input 83 of the decision circuit 75 of FIG. 1 or to the input 293 of the decision circuit 292 of FIG. 2, is connected to an input 303 of a splitter circuit 305 which from the motion vector information obtains the the x and y components of the vectors, which are supplied from an output 307 and 309, respectively, of the splitter circuit 305. The output 307 of the splitter circuit 305 is connected to an input 31 of a squaring circuit 313, an output 315 of which is connected to a first input of a summing and root-extracting circuit 318. The output 309 of the splitter circuit 305 is connected to an input 319 of a squaring circuit 321 an output 323 of which is connected to a second input 325 of the summing and root-extracting circuit 318. With the object of supplying a signal which indicates the magnitude of the motion, in this case more specifically the amplitude of the motion vectors, an output 327 of the summing and root-extracting circuit is connected to an input 329 of a comparison circuit 331 to a threshold input of which a threshold Th is applied, and an output 335 of which supplies a signal which indicates whether the magnitude of the motion is greater or smaller than the threshold Th.

In a simple embodiment of the decision circuit for the chrominance it is possible to use the x and y components of the motion vectors as an address of a look-up table comprising a (programmable) read-only memory, in which for each address it is indicated by means of a zero or a one whether the amplitude of the motion vector is less or greater than the threshold Th.

When reading the present description a person skilled in the art will have many embodiments in mind; all these embodiments are considered to be part of the invention.

I claim:

1. A method of transmitting or storing a television signal via a transmission or storage channel, the television signal comprising a video signal having a luminance and a chrominance signal, the method comprising the steps of: producing a television signal to be applied to the channel in accordance with a plurality of processing operations on the video signal which provide mutually different distributions of spatial and/or temporal resolution, choosing a processing operation from among the plurality of processing operations on the video signal, a first operation comprising the determination of motion vectors, wherein said first operation includes a second operation on the chrominance signal comprising the step of making a motion dependent choice between a third operation which provides a first distribution between spatial and/or temporal resolution, and a fourth operation which provides a different distribution between spatial and/or temporal resolution with a lower spatial resolution than at the first distribution.

2. A method as claimed in claim 1, wherein said motion dependent choice is transmitted or stored together with the television signal via an auxiliary signal.

3. A storage medium, wherein a television signal produces in accordance with claim 1 is stored in the storage medium.

4. A method as claimed in claim 1, further comprising the step of measuring the magnitude of motion occurring in the video signal and wherein said motion dependent choice depends on the magnitude of the motion.

5. A method as claimed in claim 4, wherein the amplitude of said motion vectors is used as a measure for the magnitude of the motion.

6. A method as claimed in claim 4, wherein if the magnitude of the motion is below a threshold, the third operation is chosen, and if the magnitude of the motion exceeds said threshold the fourth processing operation is opted for.

7. A method as claimed in claim 6, wherein said threshold is equal to 6 picture elements per picture period.

8. An arrangement for receiving and/or displaying a television signal, this television signal comprising a video signal with a luminance and a chrominance signal, the arrangement including means for producing a television signal in accordance with a plurality of possible processing operations on the video signal which provide mutually different distributions of spatial and/or temporal resolution, and means for choosing a processing operation from the plurality of possible processing operations on the video signal, said production means including means for a motion compensated interpolation with the aid of motion vectors at one of said processing operations, characterized in that means are provided for making a motion dependent choice in said motion compensated processing between a processing operation on the chrominace signal which provides a first distribution between spatial and/or temporal resolution, and a processing operating on the chrominance signal which provides a different distribution between spatial and/or temporal resolution with a lower spatial resolution than in said first distribution.

9. An arrangement as claimed in claim 8, further comprising means for receiving an auxiliary signal which was transmitted or stored together with the television signal for generating a control signal for said motion dependent choice.

10. An arrangement as claimed in claim 8, further comprising means for measuring the magnitude of the motion for making said motion dependent choice.

11. An arrangement as claimed in claim 10, wherein the measuring means are arranged for measuring the amplitude of said motion vectors.

12. An arrangements as claimed in claim 10, characterized by comparison means for comparing the magnitude of the motion to a threshold, wherein if the magnitude of the motion is below the threshold the first processing operation is opted for and if the magnitude of the motion exceeds said threshold the other processing operation is opted for.

13. An arrangement as claimed in claim 12, wherein said threshold is equal to 6 picture elements per picture period.

14. An arrangement for transmitting or storing a televisions signal via a transmission or storage channel, the television signal comprising a video signal having a luminance and a chrominace signal, the arrangement comprising means for producing a television signal to be applied to the channel in accordance with a plurality of possible processing operations on the video signal which provide mutually different distributions of spatial and/or temporal resolution, means for choosing a processing operation from among the plurality of possible operations on the video signal, and means for determining motion vectors in one of the processing operations, characterized by means for making at said processing operation comprising the determination of motion vectors, a motion dependent choice between a processing operation on the chrominance signal which provides a first distribution between spatial and/or temporal resolution, and an operation on the chrominance signal which provides a different distribution between spatial and/or temporal resolution with a lower spatial resolution than at the first distribution.

15. An arrangement as claimed in claim 14, further comprising means are provided for generating an auxiliary signal which is to be transmitted or stored together with the television signal for transmitting or storing said motion dependent choice together with the television signal.

16. An arrangement as claimed in claim 14, further comprising means for measuring the magnitude of the motion for making said motion dependent choice.

17. An arrangement as claimed in claim 16, wherein the measuring means are arranged for measuring the amplitude of said motion vectors.

18. An arrangement as claimed in claim 16, further comprising comparison means for comparing the magnitude of the motion to a threshold, wherein if the magnitude of the motion is below the threshold the first processing operation is opted for and if the magnitude of the motion exceeds the threshold the other processing operation is opted for.

19. An arrangement as claimed in claim 18, wherein said threshold is equal to 6 picture elements per picture.

* * * * *